United States Patent [19]
Wyman

[11] 4,068,690
[45] Jan. 17, 1978

[54] AIR RELEASE REGULATOR

[75] Inventor: Ransome J. Wyman, Redondo Beach, Calif.

[73] Assignee: Arnco, Marina del Rey, Calif.

[21] Appl. No.: 636,749

[22] Filed: Dec. 1, 1975

[51] Int. Cl.² ............................................. B65B 1/30
[52] U.S. Cl. ..................................... 141/95; 141/330; 152/415
[58] Field of Search ........................................ 141/1–7, 141/52, 59, 60, 66, 198, 19, 38, 329, 330, 94, 95, 96, 98; 152/415; 116/2, 34 R, 137 R, DIG. 7

[56] References Cited
U.S. PATENT DOCUMENTS

| | | | |
|---|---|---|---|
| 2,415,019 | 1/1947 | McMahan | 152/415 |
| 2,581,914 | 1/1952 | Darrow | 152/415 |
| 2,652,181 | 9/1953 | Rupp | 141/38 |
| 3,043,348 | 7/1962 | Wellsch | 152/415 |
| 3,866,652 | 2/1975 | Ahmad | 152/415 |

*Primary Examiner*—Houston S. Bell, Jr.
*Attorney, Agent, or Firm*—Herbert E. Kidder

[57] ABSTRACT

Apparatus for filling a vehicle tire with a reactive liquid elastomer which when cured results in a flat-free tire. The apparatus provides for pre-filling the tire with air of desired pressure to properly set the tire bead on its rim and to maintain such tire pressure during the liquid filling operation. The apparatus enables removal of residual air within the tire as the tire is being filled with liquid and also indicates when the tire is completely filled with such liquid.

5 Claims, 4 Drawing Figures

U.S. Patent    Jan. 17, 1978    4,068,690
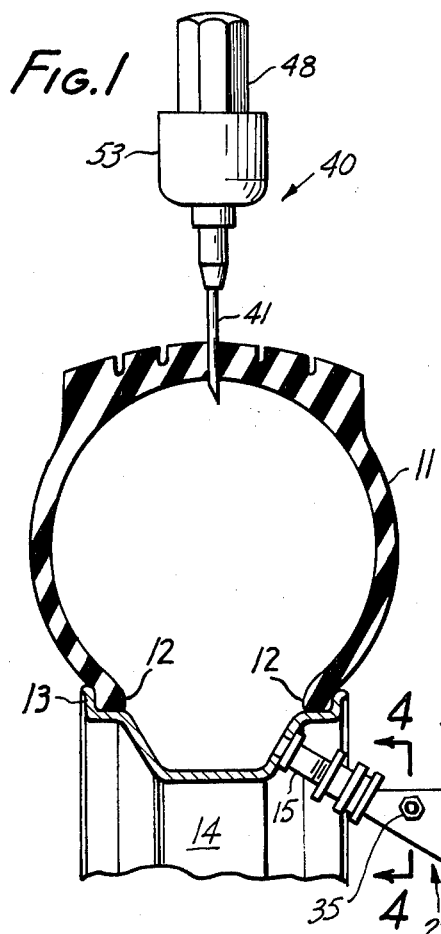
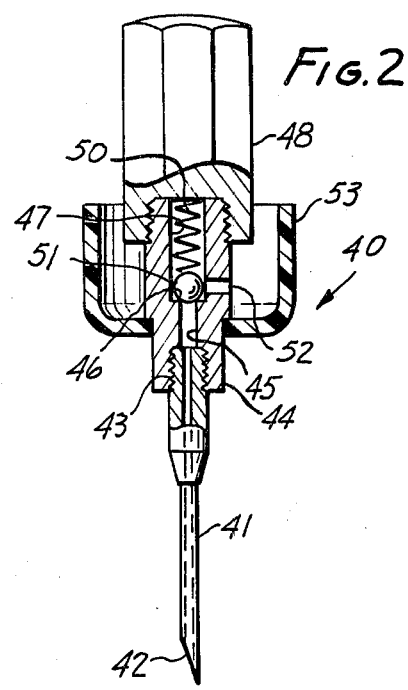
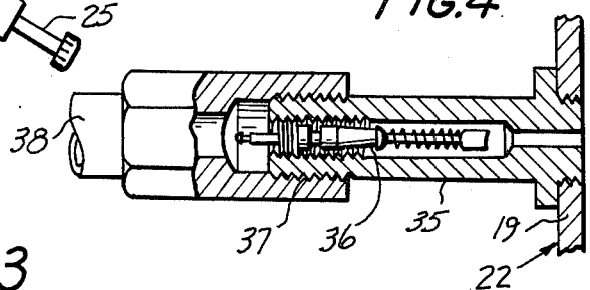
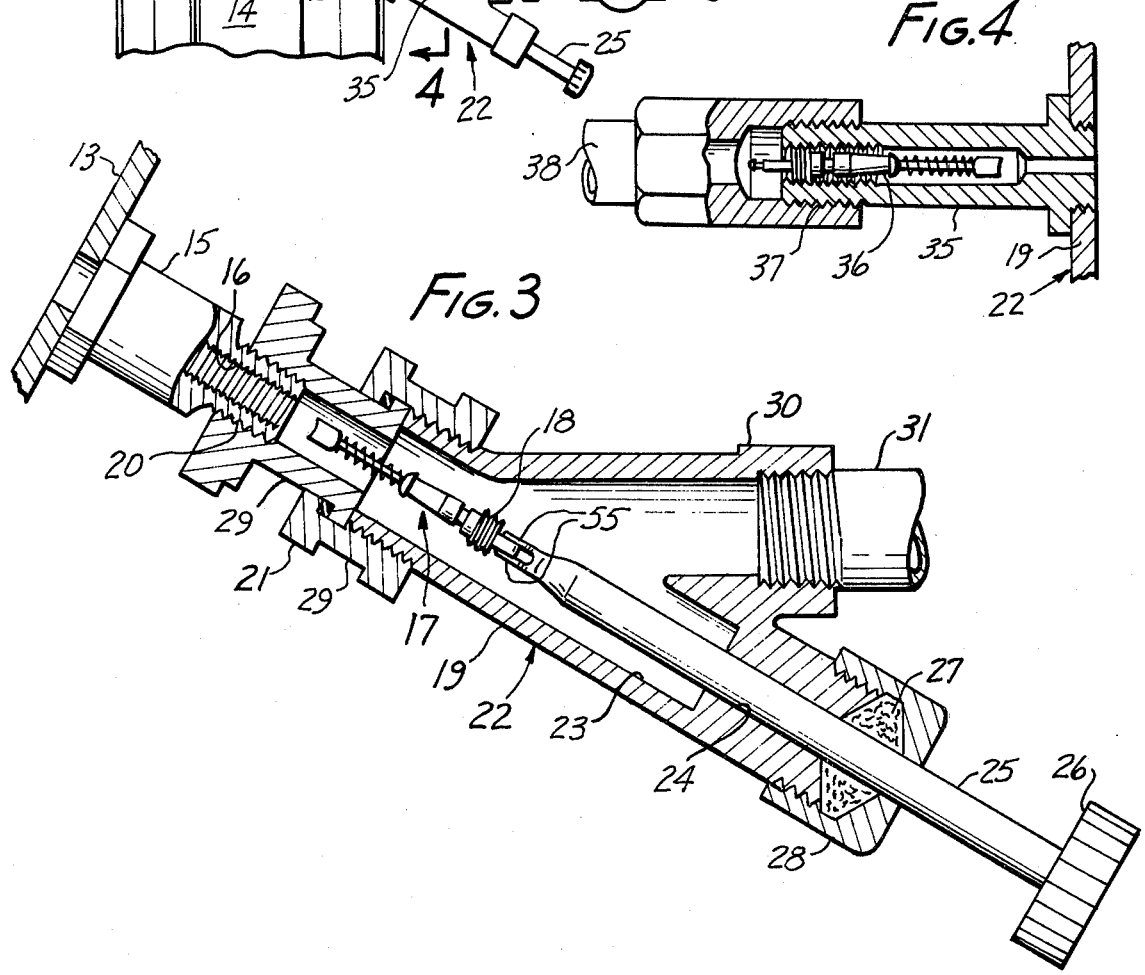

AIR RELEASE REGULATOR

BACKGROUND OF THE INVENTION

1. Field of the Invention

This invention relates to apparatus for filling vehicle tires with a reactive liquid elastomer which when cured within the tire forms a deflation-proof elastomeric filler.

2. Description of the Prior Art

Liquids, such as polyurethane elastomers combined with suitable reactants, have been developed which when injected into a pneumatic vehicle tire will cure into an elastomeric mass providing substantially the resilient qualities of air but resulting in a deflation-proof tire. Such tires are particularly desirable for use on vehicles operating under severe road conditions or where punctured pneumatic tires would present difficult "downtime" problems. Farm vehicles, industrial vehicles, military vehicles, tractors, etc., for use in either on-road or off-road service fall in this category. Also, bicycles, motorcycles, etc., which do not normally carry spare tires benefit from the use of such elastomeric filled tires.

Examples of liquid filling materials suitable for the above purpose are disclosed in U.S. Pat. Nos. 3,112,785; 3,181,735; 3,605,848; and 3,866,651.

Although elastomeric filling materials of the above type are generally satisfactory, difficulties have been encountered in properly injecting the same into the tires. For example, in the case of tubeless tires, the tube bead must be properly set on the tire rim prior to injection of the liquid or leakage will occur which is not only wasteful but requires tedious clean up. In the case of tube tires, the tube must be properly filled out and in contact with the inner wall of the tire casing. In addition, the tire pressure should remain substantially the same throughout the tire filling operation. Also, all residual air must finally be removed from the tire to eliminate air pockets in the elastomeric filler. Further, since the liquid elastomer has a much greater viscosity than air, it is difficult and time consuming to inject the same into the tire through the usual tire valve.

Heretofore, attempts were made to maintain a constant air pressure during the tire filling operation by inserting a hollow needle in the tire and then attempting to maintain the proper air pressure by controlling release of the air through the needle with one's finger as the liquid was being injected. Obviously, this is very inexact and could result in a dangerous blow-out of the tire if the operator allowed the tire to be overinflated. On the other hand, if the operator did not maintain sufficient air pressure, the tire beads, in the case of tubeless tires, could become unseated from the rim or, in the case of tube tires, the tube could collapse from the tire wall.

STATEMENT OF THE INVENTION

A principal object of the present invention is to provide apparatus for facilitating injection of a liquid elastomer of the above type into a vehicle tire.

Another object is to provide apparatus for insuring proper setting of the bead of a tire prior to and during injection of a liquid elastomer into the tire.

Another object is to decrease the time necessary to fill a tire with liquid of the above type.

Another object is to maintain a constant tire pressure during the tire filling operation.

Another object is to effect removal of the residual air in a vehicle tire which is being filled with liquid of the above type.

A further object is to indicate when a vehicle tire has been completely filled with liquid of the above type.

A further object is to provide a simple, inexpensive and reliable apparatus for properly filling a vehicle tire with a liquid of the above type.

According to the invention, an air release device comprising a pressure relief valve and a hollow needle is inserted in the tire casing to maintain a predetermined tire pressure and to release the residual air in the tire as it is being filled with liquid. A tire filling device is mountable on the valve casing of the tire and carries the valve core disassembled from the stem. A liquid filling conduit is connected to the filling device, along with an air supply conduit, enabling the tire to be prefilled with air to properly set the beads thereof and to maintain the tire in proper shape. During the filling operation, the residual air escapes through the air release device which is provided with a sound emitting feature to indicate when all of the air is removed and the tire is completely filled.

Accordingly, applicant's invention results in maintaining a constant and safe pressure within the tire at all times during the filling operation and thus eliminates unseating of the beads from the rim, in the case of tubeless tires, and collapse of the tube from the tire walls, in the case of tube tires. Also, this obviates the necessity of taking time consuming pressure readings from time to time during the filling operation and thus materially speeds up the tire filling operation.

BRIEF DESCRIPTION OF THE DRAWINGS

FIG. 1 is a sectional view through a vehicle tire and wheel illustrating a liquid filling device and an air release control device embodying a preferred form of the present invention.

FIG. 2 is a sectional view through the air release control device.

FIG. 3 is a sectional view through the filling device.

FIG. 4 is a sectional view through the air injection valve for the filling device and is taken along the line 4—4 of FIG. 1.

DESCRIPTION OF THE PREFERRED EMBODIMENT

Referring to the drawings, a vehicle tire 11 is depicted as being of the tubeless type in which the beads 12 are seated against the rim 13 of a wheel 14.

A hollow valve casing 15 is suitably secured to the rim 13 and communicates with the interior of the tire. Such casing is threaded internally at 16 to receive a conventional valve core 17. Such valve core comprises a check valve and has threads 18 adapted to be screwed into the threads 16 in the valve casing.

A hollow adapter 29 is threaded onto the exterior of the valve casing at 20 and is connected by a screw threaded coupling nut 21 to the housing 19 of a filling device 22. The latter has a cavity 23 communicating with the interior of the valve casing 15 through the adapter 29 and also has a bearing 24 formed therein to slideably receive a plunger 25 having a knob 26 thereon. A fluid tight packing 27 surrounds the plunger 25 and is retained in place by a cap 28 threaded on the housing 19.

A hollow boss 30 on the housing 19 communicates with the cavity 23 and is threadably connected to a pipe nipple 31 connected through a pressure gauge 32, a manually controlled valve 33 and a flexible conduit 34 to a suitable pump (not shown) for supplying a liquid elastomer under pressure.

A valve casing 35 (FIG. 4) is screw threaded to the wall of the housing 19 and carries a valve core 36, similar to the valve core 17, thereby forming a check valve. The valve casing 35 is connected through a threaded coupling 37 and flexible conduit 38 to a suitable source of pressured air, such as a compressor (not shown).

An air release control device generally indicated at 40, FIGS. 1 and 2, is provided to maintain the pressure within the tire at a prescribed level at all times during the filling operation. This insures that the tire beads 12 are maintained in place and that the tire is maintained at a proper contour and prevents possible bursting of the tire due to overpressurizing. Such device comprises a hollow needle 41 having a beveled point 42 to facilitate penetration into the tire casing. The needle has an enlarged upper end which is screw threaded at 43 into a cylindrical body 44 having a passage 45 therein leading to a valve seat 46 formed at the bottom of an enlarged opening 47. A cap 48 is screw threaded onto the body 44 and compresses a spring 50 against a ball 51 which is normally held against the valve seat 46. A transversely extending vent passage 52 is formed in the body 44 to permit escape of air from the interior of the tire to the atmosphere. The juncture between the opening 47 and vent passage 52 forms sharp corners so that air passing through the vent passage will emit a shrill sound.

A disposable annular cup 53, preferably of plastic, is frictionally fitted over a reduced diameter section 54 of the body 44 and extends over the vent opening 52.

Prior to the tire filling operation, the valve core 17 is removed from the valve casing 15 by use of a suitable tool (not shown) and it is inserted between two spring prongs 55 formed on the inner end of the plunger 25, as indicated in FIG. 3. Also, the adapter 29 is attached to the valve casing 15 and subsequently the housing 19 is attached to the adapter 29 by means of the coupling nut 21 and the tire is positioned so that the valve casing 15 is uppermost. Thereafter, air is applied through the conduit 38 to fill out the tire and to cause the beads 12 to properly seat on the rim 13.

Preferably after the tire has been inflated to approximately 30 psi the air release device is inserted into the tire casing at the uppermost center point, as indicated in FIG. 1. For this purpose, it is preferably driven through the tire by tapping the cap 48 with a hammer or other impact tool. It will be noted that the cap has a relatively large mass which is preferably greater than the mass of the body 44 and needle 41 to absorb some of the shock imparted thereto and thus protect the remainder of the device from damage.

As the air pressure within the tire builds up to the prescribed amount, the ball 51 will be lifted off its seat 46, permitting escape of excess air through the vent passage 52. Thus, a constant and safe pressure is maintained within the tire. The escaping air produces a shrill sound which is amplified by the cup 53 to indicate to the operator that the tire is properly inflated. He then opens the valve 33 to inject the liquid elastomer. During the filling operation the indicating sound will continue.

When the tire becomes filled with liquid, the latter will enter the needle 41 and the air flow and indicating sound will stop, indicating to the operator that the tire is filled. At this time, a small amount of such liquid may pass through the vent passage 52 and will be collected by the cup 52 which thereafter may be readily removed and replaced by another cup. The valve 33 is then closed.

Following the filling operation, the valve core 17 is forced into the valve casing 15 by means of the plunger 25 which is thereafter rotated to thread the valve core along the threads 16 into valve closing position. The air release device is then removed and the punctured hole is filled by means of a suitable plug, such as a threaded screw. Finally, the tire can be further filled with liquid, if desired, by manipulating the valve 33, until a desired pressure is obtained.

It will be obvious to those skilled in the art that many variations can be made in the exact structure shown without departing from the spirit of this invention.

I claim:

1. An air release regulator for controlling the escape of air from a pneumatic tire while the tire is being inflated and filled with a liquid resin that subsequently cures to form a solid elastomeric filling, said tire being mounted on a wheel rim having a tire valve through which air and liquid resin are injected into the interior of the tire, said air release regulator comprising, in combination:
   a body having an internal passageway provided therein;
   a hollow needle connected to said body and communicating with said internal passageway, said needle being adapted to pierce and penetrate the tread rubber on the tire;
   a spring-loaded pressure-relief valve disposed within said internal passageway, so as to allow air within the tire to escape when the internal pressure exceeds a predetermined limit;
   a vent opening extending from said internal passageway outwardly of said check valve, so as to allow air and liquid resin to escape from the tire; and
   a cup attached to said valve body to catch liquid resin escaping from said vent opening.

2. An air release regulator as in claim 1, wherein said vent opening is formed with sharp-edged corners which cause the escaping air to make an audible sound which ceases when liquid resin starts to run out, thereby indicating to the operator that the tire is completely filled with liquid.

3. An air release regulator as in claim 1, wherein said body has a head mounted thereon in axial alignment with said hollow needle, said head being adapted to be struck by a hammer to drive said needle through the tire tread.

4. An air release regulator as in claim 1, wherein said internal passageway forms a continuation of the hollow interior of said needle, said passageway having a valve seat formed therein; said pressure relief valve comprising a ball seating on said valve seat and a spring bearing against said ball to hold it against the valve seat; and said vent passage passing laterally through the wall of said housing beyond said ball so as to allow air to escape from the interior of the tire to the atmosphere.

5. An air releasr regulator as in claim 1, wherein said cup is annular in configuration and surrounds said body, with said vent passage opening into the cup near the bottom thereof, said cup being removable from said body for cleaning purposes.

* * * * *